US012431130B2

(12) United States Patent
Rajakaruna

(10) Patent No.: US 12,431,130 B2
(45) Date of Patent: Sep. 30, 2025

(54) SYSTEM AND A METHOD TO CREATE CONVERSATIONAL ARTIFICIAL INTELLIGENCE

(71) Applicant: COGNIUS AI PTE LTD, Singapore (SG)

(72) Inventor: Mundigala Arachchillage Isuru Suharshan Rajakaruna, Singapore (SG)

(73) Assignee: COGNIUS AI PTE LTD, Singapore (SG)

( * ) Notice: Subject to any disclaimer, the term of this patent is extended or adjusted under 35 U.S.C. 154(b) by 224 days.

(21) Appl. No.: 18/020,757

(22) PCT Filed: Aug. 17, 2021

(86) PCT No.: PCT/IB2021/057540
§ 371 (c)(1),
(2) Date: Feb. 10, 2023

(87) PCT Pub. No.: WO2022/038497
PCT Pub. Date: Feb. 24, 2022

(65) Prior Publication Data
US 2023/0306962 A1   Sep. 28, 2023

(30) Foreign Application Priority Data

Aug. 18, 2020 (SG) .................... 10202007911S

(51) Int. Cl.
*G10L 15/18* (2013.01)
*G06F 16/3329* (2025.01)
(Continued)

(52) U.S. Cl.
CPC ...... *G10L 15/1815* (2013.01); *G06F 16/3329* (2019.01); *G06F 16/35* (2019.01); *G10L 15/22* (2013.01); *G10L 15/30* (2013.01)

(58) Field of Classification Search
CPC ..... G10L 15/1815; G10L 15/22; G10L 15/30; G06F 16/3329; G06F 16/35
See application file for complete search history.

(56) References Cited

U.S. PATENT DOCUMENTS 10,176,167 B2\* 1/2019 Evermann ............... G06F 40/35
2003/0137537 A1\* 7/2003 Guo ..................... G10L 15/1822
704/E15.04

(Continued)

OTHER PUBLICATIONS

Search Report and Written Opinion dated Nov. 24, 2021 issue for International PCT Application No. PCT/IB2021/057540.

*Primary Examiner* — Eric Yen
(74) *Attorney, Agent, or Firm* — K&L Gates LLP

(57) ABSTRACT

A system and a method to create a conversational artificial intelligence is disclosed. The presented system is uniquely designed to drive more human-like but yet robust conversations via text or voice. In at least one embodiment, the disclosed system is implemented on at least one computing device that can respond to at least one communicating entity which is hereinafter referred to as the user. The system can be configured to drive a conversation in any knowledge domain. The system disclosed herein, uses natural language processing techniques, natural language synthesis techniques and a novel strategy to respond to user inputs. The novel strategy may include a fundamental model of human conversation, an algorithm to correlate user inputs to the aforesaid model, an algorithm to handle questions from the user, an algorithm to avoid undesired inputs from the user and finally an algorithm to predict the next response generated by the system.

12 Claims, 11 Drawing Sheets

(51) Int. Cl.
    *G06F 16/35*     (2025.01)
    *G10L 15/22*     (2006.01)
    *G10L 15/30*     (2013.01)

(56) References Cited

U.S. PATENT DOCUMENTS

| | | | |
|---|---|---|---|
| 2004/0021899 A1* | 2/2004 | Jost | G06F 3/1207 |
| | | | 379/265.09 |
| 2005/0278180 A1* | 12/2005 | O'Neill | G10L 15/22 |
| | | | 704/E15.04 |
| 2006/0198501 A1* | 9/2006 | Marche | G10L 15/22 |
| | | | 704/E15.04 |
| 2017/0060917 A1 | 3/2017 | Marsh | |
| 2018/0174578 A1* | 6/2018 | Bangalore | G06F 40/137 |
| 2018/0301141 A1* | 10/2018 | Altaf | G06N 20/00 |
| 2018/0322121 A1 | 11/2018 | Barker et al. | |
| 2019/0206402 A1* | 7/2019 | Shukla | G06F 3/011 |
| 2020/0110882 A1 | 4/2020 | Ripolles et al. | |
| 2020/0118566 A1* | 4/2020 | Zhou | G06F 9/4806 |
| 2020/0349180 A1* | 11/2020 | Kempf | G06F 16/367 |
| 2021/0134179 A1* | 5/2021 | Zilca | G06F 40/40 |
| 2021/0279563 A1* | 9/2021 | Sgobba | G06N 3/044 |
| 2022/0414341 A1* | 12/2022 | Zotto | G06F 40/35 |
| 2024/0221908 A1* | 7/2024 | Blackwell | G06F 40/56 |

\* cited by examiner

SYSTEM AND A METHOD TO CREATE CONVERSATIONAL ARTIFICIAL INTELLIGENCE

PRIORITY CLAIM

The present application is a National Stage of International Application No. PCT/IB2021/057540, filed on Aug. 17, 2021, which claims priority to Singapore Application No. 10202007911S, filed on Aug. 18, 2020. The entire contents of both applications are incorporated by reference in its entirety for all purposes.

BACKGROUND

Any discussion of the prior art throughout the specification should in no way be considered as an admission that such prior art is widely known or forms part of the common general knowledge in the field.

The systems based on artificial intelligence (AI) that can imitate human conversations were out there for decades. It is an argued topic, to which extent an AI program is capable of imitating human behaviours. Various methods are used to measure the performance of AI in terms of producing outcomes similar to human thought patterns. The so-called Turing test is one such method to determine the performance of AI programs in terms of the aforesaid aspect. However, it is interesting to note that the modern attempts at knowledge driven conversational AIs typically struggle to pass the Turing test. Further, it is interesting to note how easily a well-implemented conversational AI is confused or fails to generate relevant responses just by introducing trivial, but out of the topic user dialogs. As a result, it is significantly challenging to implement reliable process automations using conversational AI technologies.

There is accordingly a need for systems or methods which address some or all of the above issues, or at least provides an alternative to conventional systems for imitating human conversations.

SUMMARY OF THE INVENTION

In a first aspect of the present invention, there is provided a computer implemented method for processing natural language utterances and generating natural language responses, the method comprising: receiving user utterances in a natural language; classifying the user utterances into one or more intents; defining a knowledge domain and a scope for a conversational task for the one or more intents; configuring the conversational task as a combination of sub conversation units, wherein each sub conversation unit is bounded by a specific objective, whereby the system can transfer between sub conversation units depending on the outcome of previous sub conversation units, to drive the overall conversation; and extracting information from the user utterances based on a localized strategy for the current sub conversation unit; and generating responses to the user utterances in the natural language, based on the current sub conversation unit.

In a second aspect of the present invention, there is provided a system for processing natural language utterances and generating natural language responses comprising: one or more processing units with one or more memory units configured to: receive user utterances in a natural language; classify the user utterances into one or more intents; define a knowledge domain and a scope for a conversational task for the one or more intents; configure the conversational task as a combination of sub conversation units, wherein each sub conversation unit is bounded by a specific objective, whereby the system can transfer between sub conversation units depending on the outcome of previous sub conversation units, to drive the overall conversation; and extract information from the user utterances based on a localized strategy for the current sub conversation unit; and generate responses to the user utterances in the natural language, based on the current sub conversation unit.

Generating responses to the user utterances may further comprise connecting to a database to retrieve further information required to generate the responses, or to update the information extracted from the user utterances in the current sub conversation unit.

Classifying the user utterances may further include providing one global level intent classification, which is used as a default in the case that the system has no reference to a sub conversation which is going to be continued for a given user session. it may also include multiple intent classification stages individually implemented in each sub conversation unit, where in one sub conversation unit the multiple intent classification levels represents at least one of:
  a classification on user's intent to continue the current sub conversation unit;
  a classification to decide whether the user utterance should be answered based on related facts to the main objective of the sub conversation unit;
  a classification to decide whether the user wants to update previously provided information; and/or
  a classification to decide whether the last utterance forwarded by the system has been understood while being in the same sub conversation unit.

The classification to decide whether the user utterance should be answered based on related facts to the main conversation of the sub conversation unit, may be linked to a structure of facts related to each other in different forms, where the relationships and the order of relationships are organized as a natural language based paragraph, strategically formed, from which the answers are derived upon the classification outcome of the aforesaid classification level.

Configuring the conversational task into sub conversation units may comprises configuring at least one of the following:
  an information seeking sub conversation unit which is focused on gathering information from a user on a particular knowledge subdomain, and which preferably uses a predefined question set is used to drive the sub conversation;
  a decision making sub conversation unit which is focused on decision making based on user utterances guided by a predefined set of questions, where one of the decision states is derived based on answer combinations extracted from user utterances;
  an information utterance sub conversation unit which is focused on uttering information based on a knowledge source, on a defined topic, in accordance with requests derived from the user utterances.

The systems and methods disclosed herein address the mentioned problem(s), and/or provide other advantages, by considering and modeling fundamentals of human conversations.

Conventional systems fail to handle conversations outside of the configured path unless the exception handling strategies are intentionally configured. Therefore, someone who configures conventional systems has to consider all the main possibilities of exceptions or variations and provide the system responses accordingly, making the configurations very difficult to manage. Also, a slight change of the business process results in a lot of changes which may lead to inconsistencies.

As an example, a simple set of questions to collect contact information requires at least following variations to be handled per each question or as a group of questions which leads to a complex implementation. These possibilities alone can transform configuring a few questions into a complex configuration task.
- a. Users might ask for rephrasing the question.
- b. Users might need to re-correct one of the previously provided answers.
- c. Users might want to know additional information such as privacy policy or even information about the current question such as a format of a date.

In conventional systems, it is difficult to handle or there is no proper method to handle scenarios where users spontaneously go out of the flow to know other related information and later resume the previous conversation. As an example, in a scenario of a user trying to book a hotel room, while providing contact information or just before confirming the payment details, the user might intend to refer to the Frequently Asked Questions section and know more about cancellation policy of the reservation. After having required information, the user might require to resume the original conversation to complete the booking process.

Following is the applicant's unique view of conversation fundamentals that leads to the current invention.
1. A conversation in a knowledge base is composed of discrete sub conversation units based on sub knowledge bases and the nature of the sub conversation units can have one of the following forms. Please note that the two parties can have multiple dialogs, deviations and recorrection attempts while being in the same conversation unit.
   a. Information Seeking: One party drives a conversation to acquire information from the other party. Examples: Noting down contact information, asking for a cooking recipe, etc.
   b. Decision Making: One party tries to derive one of many decision states by listening to or querying the other party on a sub knowledge base. The party who listens might end the sub conversation upon deriving a decision state. To derive a decision state the listening party may use a combination of criteria and questions from the listening party may come as an attempt to direct the conversation in order to get inputs for the criteria combinations. Example: One party tries to derive what type of food the other party prefers to have, within the constraints of the first party's capability of making the food.
   c. Information Utterance: One party becomes the source of information and the other party tries to either drive the conversation as mentioned in (a) or (b) above.
2. A conversation can have a state usually referred to as so called "small talks" or "chit chat". We believe it is the result of two brains trying to synchronize emotional states where no effective information/outcome is gained from the conversation. In our model, this is an additional temporary state that the two parties can switch into, during a conversation as discussed in (1) above.
3. Any dialog that can happen, which does not fall in to above (1) or (2) represents nothing but, a transition between the three forms of conversation units as mentioned in (1) above or the additional temporary state as mentioned in (2) above.

In accordance with some embodiments of the invention, it is important to implement a good strategy to exit from the sub conversation units which may otherwise result in looping behaviours, and also to come back to a previous sub conversation and resume a sub conversation after transferring to other sub conversations. In the same context, the system sticks to the same unit while trying to drive the conversation in the desired path (which achieves the configured goal of the system). Therefore the algorithms exposed hereinafter will try to achieve the right balance between exiting from sub conversation block and trying to be in the same sub conversation block while trying to drive the conversation in the desired path. The background of the strategy is as follows.
1. Multi level intents: Intents of the user derived from the user's utterance might have different meaning based on the situation. Hence the system maintains layers of intents as follows.
   a. Gobal Level Intents: Users utterances will be mapped to a predefined set of intents and based on the mapped intent, the system will transfer into a sub conversation unit. This can happen, when the user responds initially or if a sub conversation unit meets some exit criteria (such as does not want to continue the sub conversation, the system does not know how to respond to the user's last utterance within a sub conversation, the user switches topics signalling a start of another sub conversation, etc.)
   b. Sub Conversation Level 1 Intents: If there is a conversation going on in one sub conversation unit, the user's current utterance will be mapped into one of the predefined intents in the set of Sub Conversation Level 1 Intents. According to the derived intent, the system decides whether the user wants to continue the discussion or not within the same sub conversation.
   c. Sub Conversation Level 2 Intents: If there is a conversation going on in one sub conversation unit and if Sub Conversation Level 1 intent implies a continuation of the discussion in the same sub conversation, then the user's current utterance is mapped to one of the predefined set of Sub Conversation Level 2 Intents. According to the derived intent, the system decides whether or not the user queries about a fact related to the same sub conversation can be handled. If the answer is positive to the above, then the user's utterance will be handled by the strategy mentioned in (2) below. Else, the user's utterance will be handled by the intent level in (d) below.
   d. Sub Conversation Level 3 Intents: If there is a conversation going on in one sub conversation unit and if Sub Conversation Level 2 intent implies a potential forwarding of the user's utterance to be handled at Sub Conversation Level 3 Intents, then the user's utterance will be mapped into one of predefined set of intents which are either,
      i. Used to extract particular information (such as but not limited to email addresses, names, etc.) if the current sub conversation unit is one of the two forms of the following sub conversation units
         1. Information Seeking
         2. Decision Making
      or, ii. Used to derive conversation handing actions such as but not limited to question rephrasing, going to previous questions, going to next question, etc.

In case of failure to perform above (i) and (ii) from the user utterance, the system will proceed on asking followup questions from the user as a guidance.

2. Fact based short conversations:

We have observed that the questions from the users can be categorized into four categories.

a. Questions that controls the transitions between the sub conversations b. Questions that drive the conversation within an Information Seeking sub conversation unit.

c. Questions that are used for error correction (such as but not limited to rephrasing) during a sub conversation.

d. Questions on the related facts of a sub conversation that usually expect short but precise answers from the system. An example would be, a question asking "Is there a cancellation policy?" and the expected answer can be "yes" or "no" explaining the reason.

Under the current section, above point (d) will be discussed. To configure a fact and related facts, paragraphs (that includes all the related) will be used. The system is able to answer the type of questions that falls under category (d), based on the aforesaid paragraph definitions.

A detailed description of one or more embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention.

The present invention may be practiced according to the claims without some or all of these specific details. For the purpose of clarity, technical material that is known in the technical fields related to the invention has not been described in detail so that the present invention is not unnecessarily obscured.

BRIEF DESCRIPTION OF DRAWINGS

Embodiments of the invention will now be described by way of example only with reference to the accompanying drawings.

FIG. 10 depicts a flowchart of a method according to an exemplary embodiment of the present disclosure.

DETAILED DESCRIPTION

In the present disclosure, depiction of a given element or consideration or use of a particular element number in a particular figure or a reference thereto in corresponding descriptive material can encompass the same, an equivalent, or an analogous element or element number identified in another figure or descriptive material associated therewith. The detailed embodiments of the current invention depicted herein are merely exemplary of the current invention. They are not limited to the specific structure or details disclosed herein while serving the purpose of supporting current claims presented herein and further providing guidance to one skilled in the art to employ the present invention virtually in any form of detailed structure. Also the terms and the phrases used herein shall not be limited; but used to describe the present invention in an understandable manner. In a number of instances, known systems, methods, procedures, and components have not been described in detail so as to not unnecessarily obscure aspects of the embodiments of the present disclosure.

Figure 1A:
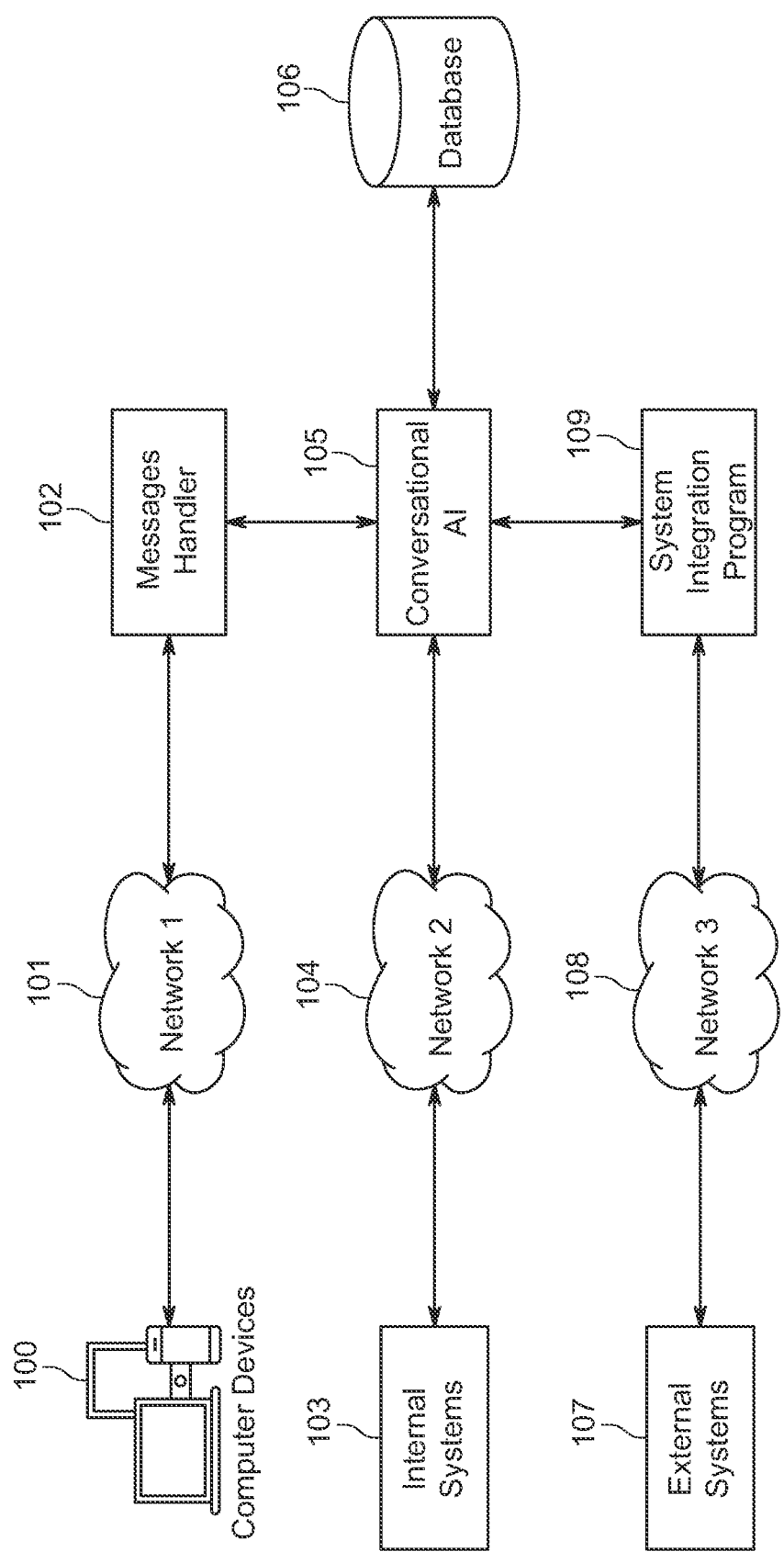
FIGS. 1A and 1B depict exemplary architectures of the overall system of an embodiment of the present invention.

FIG. 1A is an exemplary implementation of the overall system on a computer network. Users can access the system through communication devices 100 such as but not limited to mobile phones and computers. The communication can be in the form of text or voice. System 102 handles the messages received by the devices 100, and in the case of receiving voice of a voice based communication, system 102 converts the voice into natural language text using any form of voice to text conversation technology. Output of system 102 will be in the form of text which is understood by system 105. Further, any response generated by system 105, will be forwarded back to the communication devices 100, in the form of natural voice synthesized by the system 102 or as a form of text. System 102 can be implemented in a form of single or multiple computer systems where the details are not discussed in the scope of the present invention.

The scope of the current invention lies mainly within system 105, which will be depicted and explained in detail in FIG. 1B, FIG. 10, FIG. 2, FIG. 3, FIG. 4, FIG. 5 and the subsequent sections. The purpose of system 105 is to understand the natural language communicated by the user and reply back to the user in natural language with information or instruction derived from a predefined knowledge domain. Whenever desired, system 105 reads and writes system configurations, system logs, knowledge domain related data or other relevant data from or to database 106, which can be implemented on single or multiple computer devices.

System 109, is used by system 105 in order to read or write data from or to internal systems 103 or external systems 107. Functionality of system 109 is to format data and maintain a communication between system 105 and external or internal systems via computer networks 104 or 108. Computer network 104 and 108 may represent any computer network that uses any form of communication techniques. System 103 and 107 can represent implementations of services such as but not limited to databases, email services and alert generating services.

Figure 1B:
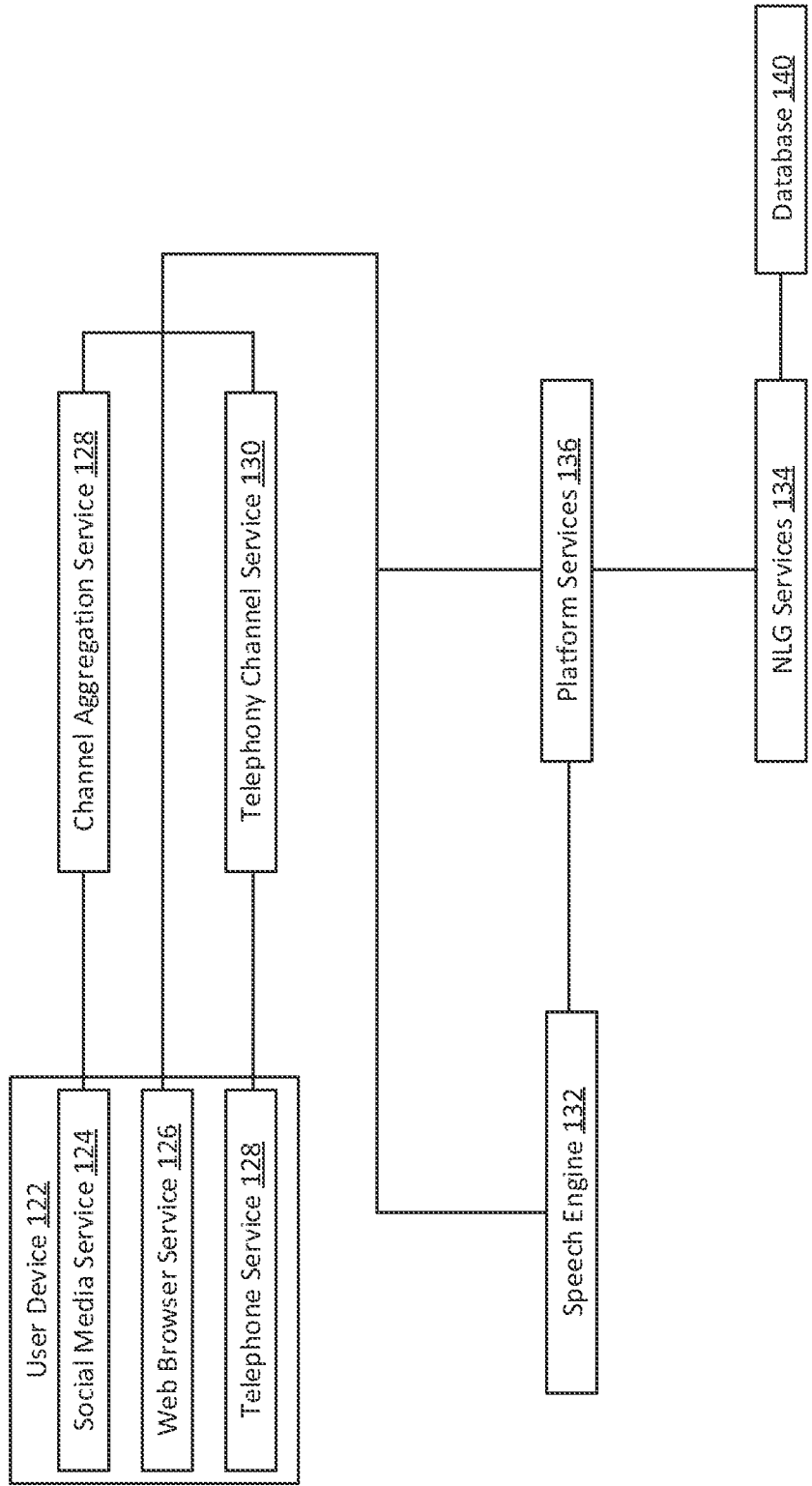
Figure 1C:
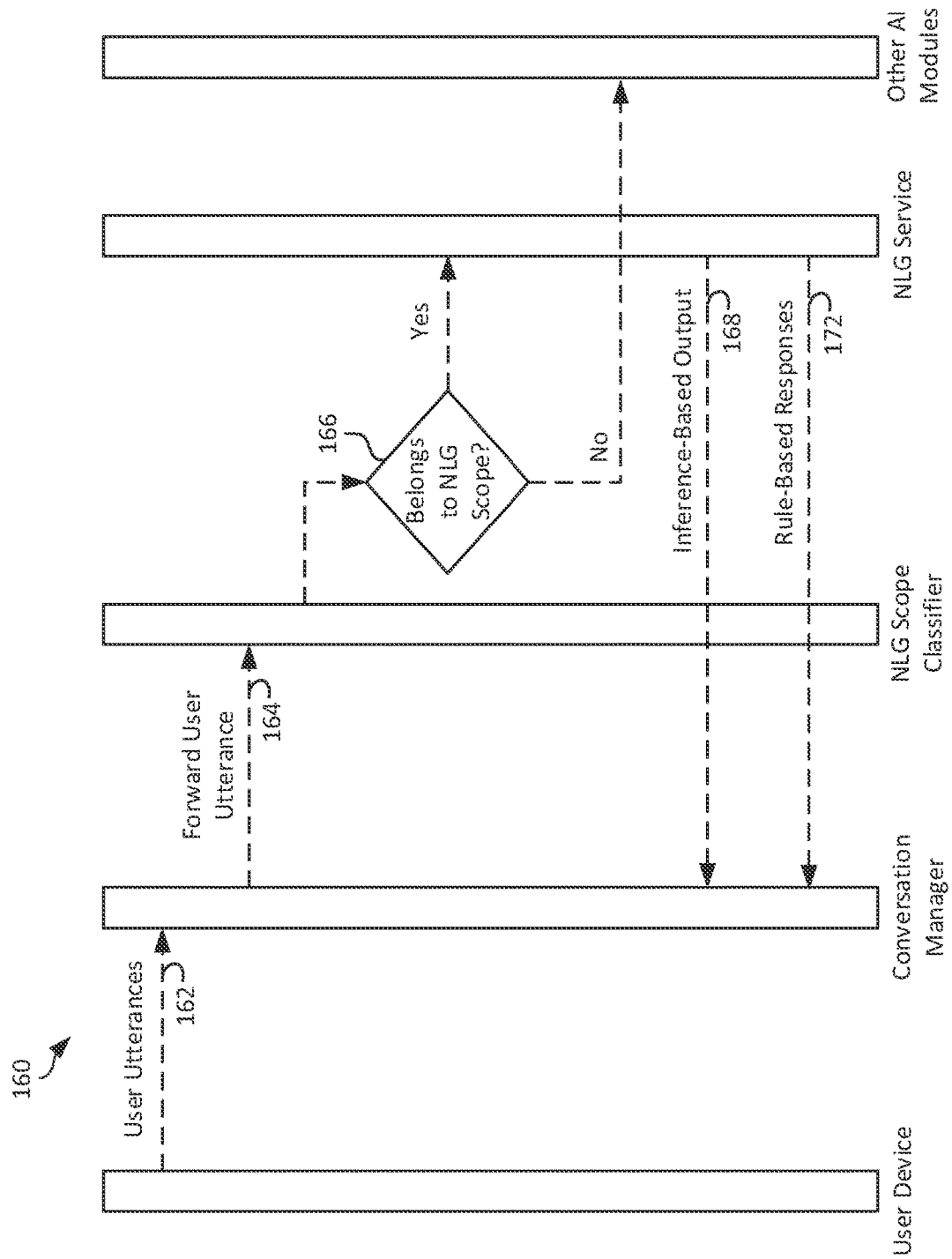

FIG. 1B is an exemplary implementation of a system 200 according to an exemplary embodiment of the present disclosure. The system 200 may be configured to receive and process utterances from users. In particular, the system 200 may be configured to receive utterances from user devices 122. The user device 122 may include personal computing devices associated with one or more individual users. For example, the user device 122 may include one or more of a smartphone, tablet, laptop, wearable computing device, smart speaker, or any other personal computer.

The user device 122 includes a social media service 124, a web browser service 126, and a telephone service 128. The services 124, 126, 128 may represent different means for receiving or transmitting utterances (e.g., text utterances, audio utterances) for future processing (e.g., via the NLG system 134). The social media service 124 may include one or more social media platforms, such as Facebook, Instagram, Snapchat, Line, WhatsApp and the like. In certain instances, the social media service 124 may execute on the user device 122 and/or may execute on another computing device (e.g., a cloud computing device implemented by the social media provider). The web browser service 126 may represent a web browser executing on the user device 122 and/or may represent a computing services executing on another computing device that is accessed via the user device. The telephone service 128 may include a service capable of placing calls (e.g., via a cellular telephony network, a voice over IP (Vol P) service) capable of transmitting and receiving audio communications in real time. In certain instances, utterances may be received from additional or alternative services (e.g., an email services, an SMS service, and the like). Utterances may be received via the services 124, 126, 128. For example, audio utterances may be received via the telephone service. As another example, audio utterances may be received as digital audio files recorded on the user device 122 and transmitted to a social media service. As a still further example, text utterances may be received as text files (e.g., status updates, chat entries) entered via the web browser service 126 and/or the social media service 124.

In certain implementations, utterances may be received from the user device 122 via intermediary services. For example, the system 120 includes a channel aggregation service 128 and a telephony channel service 130. The channel aggregation service 128 may be configured to receive text or audio data from social media services 124. For example, the channel aggregation service 128 may communicate with social media services 124 according to application programming interfaces (APIs) associated with the social media services 124. In certain implementations, the channel aggregation service 128 may be implemented by one or more of Twilio, Route Mobile, Gupshup services, and the like. In certain implementations, utterances may be received from social media services 124 and/or web browser services 126 via a WebSocket as well. The telephony channel service 130 may be configured to receive telephony communications according to one or more session initiated protocols (SIPs). For example, the telephony channel service may include one or more SIP servers configured to receive calls and connect calls to other computing services.

In certain instances, audio utterances received from the user device 122 may need to be converted into text for further processing. Accordingly, the system 120 includes a speech engine 132 that may be configured to receive audio files (e.g., of human speech) and to convert speech contained within the audio files into text files of what was said in the audio files. In certain implementations, the speech engine 132 may executed as a cloud service on a cloud computing platform (e.g., as a distributed computing service executing on multiple computing devices).

Platform services 136 may be configured to receive and process utterances. For example, the platform services 136 may receive the text output from the speech engine 132 for audio utterances received from the user device. As another example, the platform services 136 may directly receive text utterances from the user device 122 and/or from the channel aggregation service 128 and telephone channel service 130. In certain instances, the platform services 136 may receive streamed data from the user device 122, the channel aggregation service 128, telephony channel service 130, and/or the speech engine 132 via a WebSocket channel.

The platform services 136 may be configured to route received utterances between different NLG services 134 and/or different artificial intelligence models. In particular, the NLG services 134 may include different services and/or machine learning models that generate responses to different types of utterances or user queries. The platform services 136 may be configured to determine when a response is needed to a received user utterance and, when necessary, to forward the utterance to an appropriate NLG service 134 for further processing.

FIG. 10 depicts a flowchart 160 of an exemplary implementation of this determination. The flowchart 160 includes the user device 122, an NLG service 176, and other AI services 174. The NLG service 174 may be exemplary implementations of the NLG services 134 and the other AI services 174 may include one or more natural language processing, natural language understanding, and/or other text classification module. The flowchart 160 also includes a conversation manager 178 and an NLG scope classifier 180. The conversation manager 178 and the NLG scope classifier 180 may be implemented by the platform services.

The conversation manager 178 of the platform services 136 may receive a user utterance (162) from the user device 122. The conversation manager 178 may forward the user utterance to a proper NLG scope classifier 180 (164). For example, different types of utterances (e.g., information seeking intent, decision making intent) may use different classifiers and/or different NLG services. The conversation manager 178 may determine an initial classification for the received user utterance (e.g., using a classifier model, based on one or more keyword searches) and may identify the corresponding NLG scope classifier 180 based on the initial classification.

The NLG scope classifier 180 may then analyse the user utterance to determine whether the user utterance belongs within a scope of the NLG scope classifier 180 (166). For example, the NLG scope classifier 180 may be a classifier model or other type of machine learning model configured to classify received utterances as belonging or not belonging to a particular type of utterance. In this way, the NLG scope classifier 180 may be used to validate the initial classification from the conversation manager. If the user utterance does belong within a scope of the NLG scope classifier 180, the user utterance may be forwarded to an associated NLG service 176 for processing. In particular, the NLG service 176 may generate a response to the user utterance, as explained further below. For example, the NLG service 176 may generate an inference-based processed NLG output (168) using one or more machine learning models. As another example, the NLG service 176 may generate one or more rule-based responses (172). If, however, the user utterance does not belong within the scope of the NLG scope classifier 180 (or the NLG service 176), the user utterance may be forwarded to other AI modules 174 for processing. For example, if a user has received an automated request for their telephone number and the user utterance contains the user's telephone number, the user utterance may be processed by an NLU process to extract the phone number, rather than by an NLG service 176 to generate a response.

Returning to FIG. 1B, the NLG services 134 may be configured to generate responses to user utterances. These responses may then be transmitted to the user device 122. In certain instances, the NLG services 134 may receive the requests and user utterances as HTTP requests (e.g., JSON-based HTTP requests containing a text version of the user utterance's contents). The NLG services may be configured to generate responses to unpredictable or novel forms of user utterances. Most such queries can be successfully answered using pre-categorized knowledge bases, which may be stored on databases 140 that are communicatively coupled to the NLG services 134. In certain implementations, the NLG services 134 may include one or more machine learning models (e.g., neural network models) configured to generate responses based on pre-defined knowledge banks. Such configurations reduce the effort required to predict and hard code responses to infrequent (or unpredictable) user requests or queries. For example, the NLG services 134 may be trained using datasets such as one or more of the databases summarized in Table 1 below.

TABLE 1

| Dataset | Description | Metadata |
|---|---|---|
| Verbalization Database | A dataset that contains questions, factual answers, and verbalized complete answers. Verbalized answers may embedded factual answers into complete sentences. | Questions, factual answers, and verbalized answers. |
| Paragraphs Database | A dataset that contains paragraph forms of questions and answers. The paragraphs may target reading comprehension based on discrete reasoning (e.g., additions, sorting). | Paragraphs, questions, and answers. These may be categorized (e.g., into dates, numbers, strings). |
| Abstract Meaning Database | A dataset that combines complete sentences with machine readable representations of the sentence. For example, each sentence may include an accompanying tree-structure representing the sentence's meaning. | Machine-readable representations of sentences, such as non-core semantic roles, within-sentence coreference, named entity annotation, modality, negation, questions, and quantities. |
| Question-Answer Database | A database that includes questions regarding a specific body of information (e.g., Wikipedia articles). The answer to each question may be provided as a segment of text or a portion of the body of information that contains the associated information. | Paragraphs (e.g., the body of information), questions, and answers. |

Figure 2:
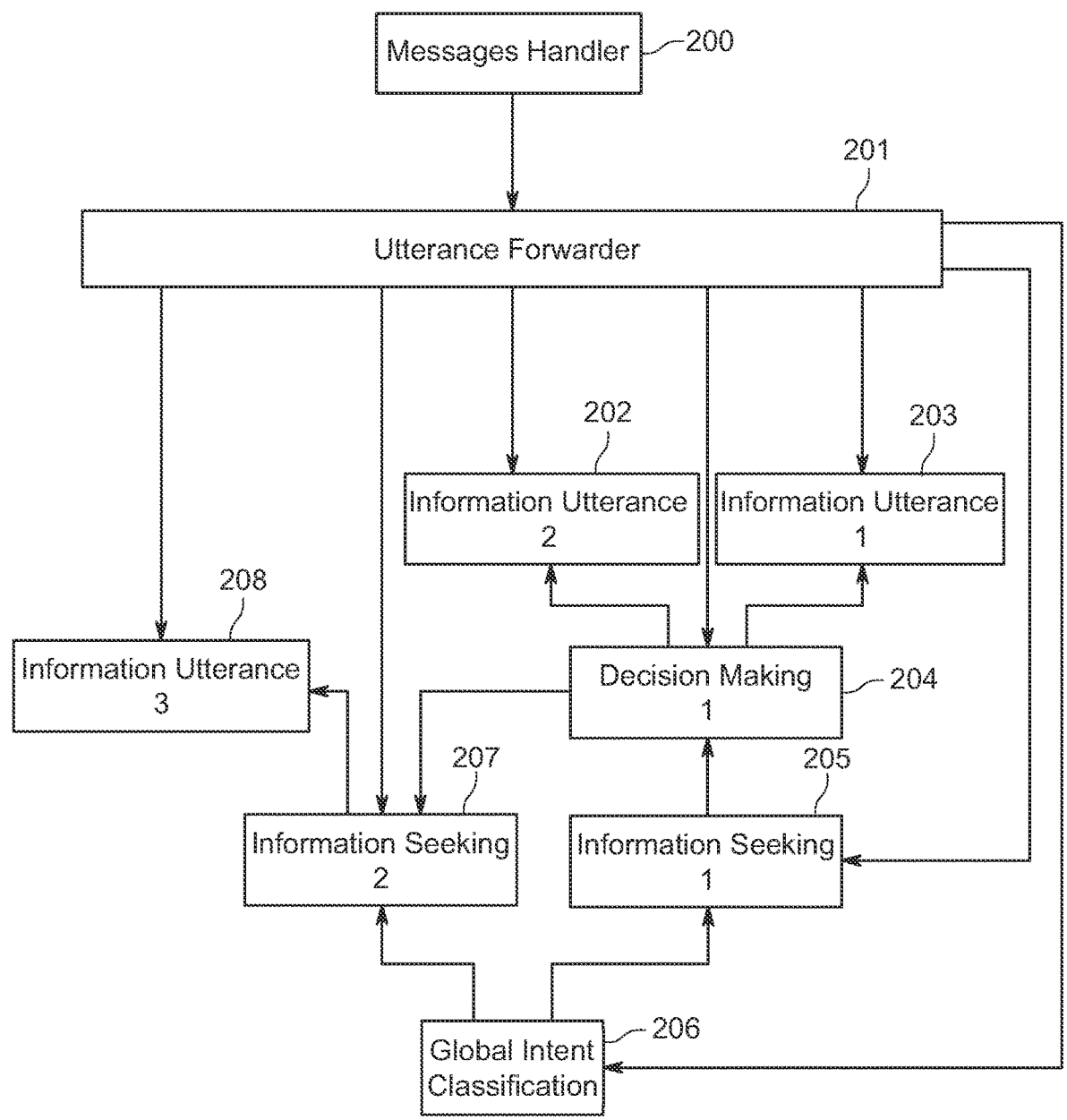
FIG. 2 depicts an exemplary implementation of a conversational artificial intelligence system based on the concept of sub conversation units, according to an embodiment of the present invention.

FIG. 2 is an exemplary implementation of a process 200 achieving an exemplary conversational process automation. Hence, the order and the number of Information Seeking, Decision Making and Information Utterance sub conversation units exclusively depict the present exemplary implementation and further the structure of such sub conversation units may vary in other implementations of conversational process automation applications. In certain implementations, the process 105 may be implemented by the system 120 (e.g., platform services 136 and/or the NLG services 134). In the present invention, it is highly considered that the meaning or the intention of any user utterance will depend on the sub conversation within a conversation. Therefore, it is clear that the same utterance may be classified with different intents in the Global Intent Classification 206 and in sub conversation units. The intent classification in sub conversation also has multiple levels, at least a subset of which are discussed in the subsequent sections in detail. Process 200 may be an exemplary implementation of the process 102.

Utterance forwarder process 201 forwards user utterances to the correct unit depending on states stored in process 201. Process 201 keeps a state (in memory) on the current sub conversation unit per user to which the user utterances from process 200 is forwarded. It is also possible that aforesaid state per user in process 201 might be empty and as a result the user utterances coming from process 200 may be forwarded to the Global Intent Classification 206. Depending on the outcome generated by 206 in such scenarios, the state per user may be updated in process 201 which results in forwarding the next user utterance according to the state in 201 linking a new sub conversation unit. For example, in the depicted scenario, the state is updated to either unit 205 or unit 207. Nevertheless, it is possible to have predefined forwarding rules in process 201 to define the next sub conversation after existing a particular sub conversation (without completing subconversation's goal). In such cases, 206 is not used to decide the next sub conversation and process 201 uses the predefined rule in the memory to decide the next sub conversation. This scenario is referred to as Rule Based Exist.

The transition from one sub conversation to the other based on Rule Based Exist or via process 206 is called Sticky Exit. If the last sub conversation status before transition happens, an indication is stored by the utterance forwarder 201 and referred back when the new sub conversation is over. Sticky Exit may be configured as a routing rule in 201 applied only for particular sub conversations. As a result, behaviours similar to the following exemplary scenario can be handled by the current invention, providing rich conversational experience.

In an exemplary sub conversation, a user tries to renew a motor vehicle insurance policy that he or she has previously purchased. But suddenly the user may try to check for other motor vehicle insurance plans that may be available for purchase. After checking the other insurance plans, the user comes back and resumes the original insurance renewal related sub conversation (e.g., to renew the previously-purchased policy). This return may be enabled by an indication of the earlier conversation (e.g., regarding the previously-purchased policy) stored by the utterance forwarder 201.

Figure 3:
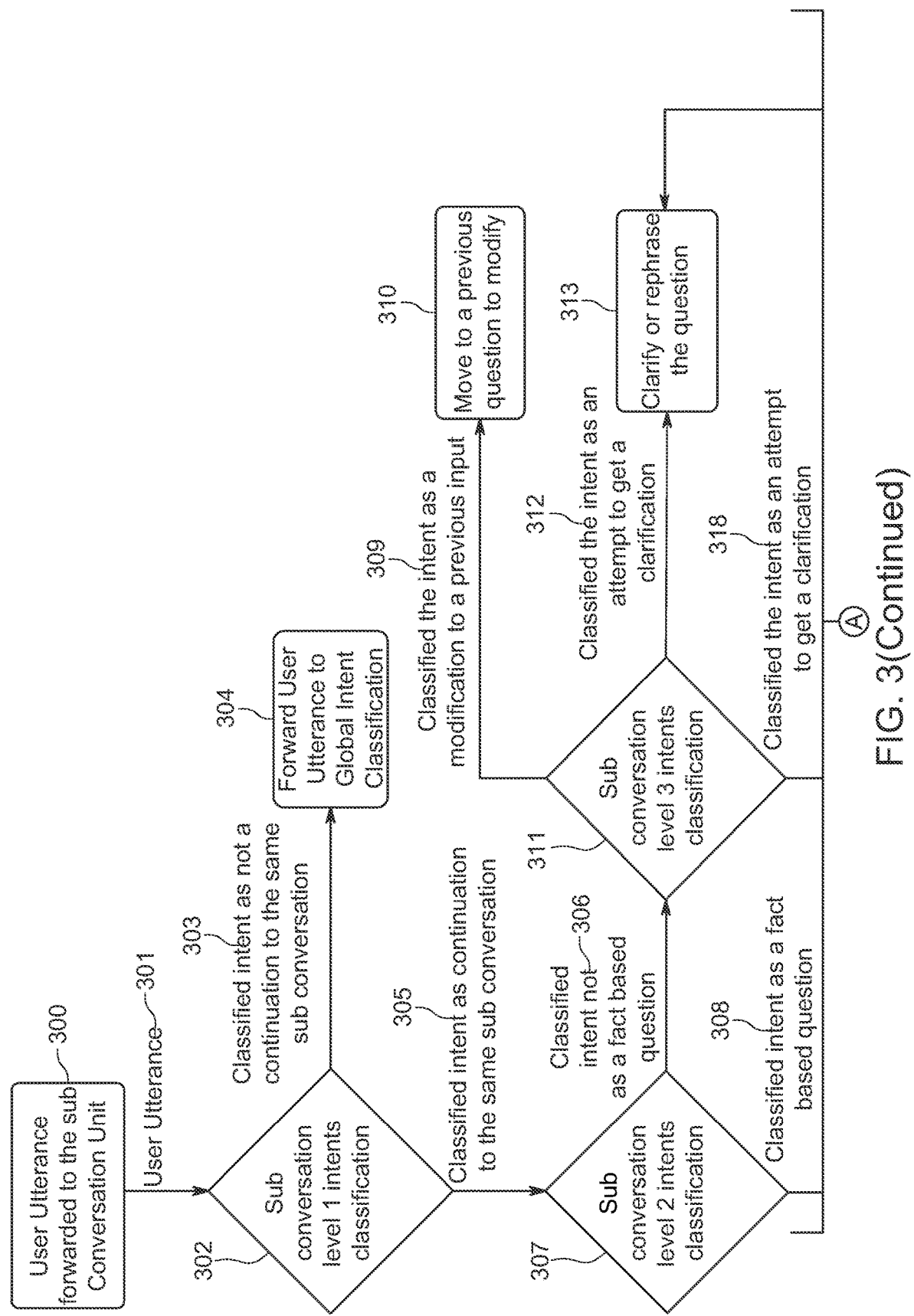
FIG. 3 is a flow chart explaining the dialog management strategy in an Information Seeking sub conversation unit, according to an embodiment of the present invention.
Figure 3:
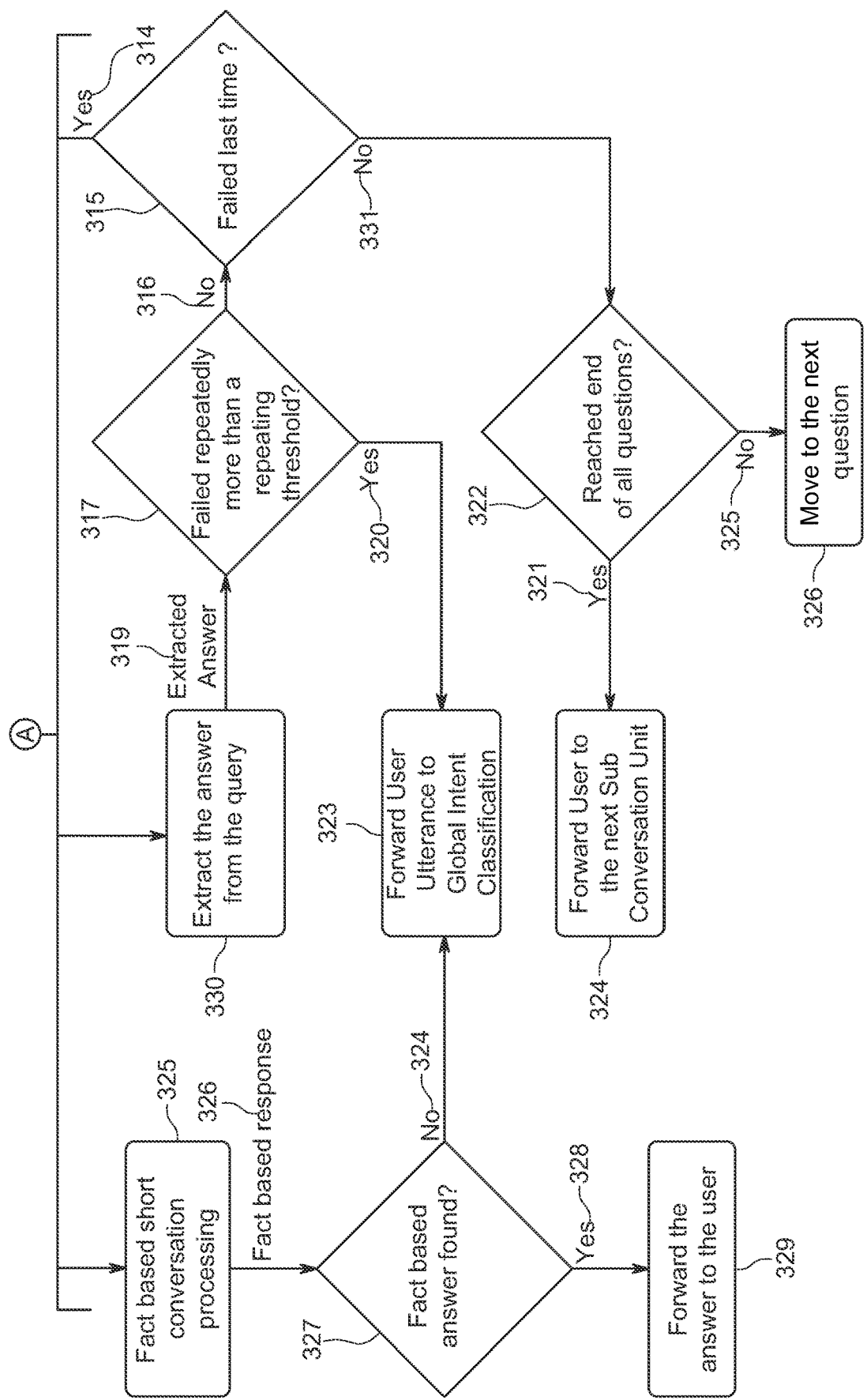

Information Seeking units such as 205 and 207, may drive sub conversations as depicted in FIG. 3 and further explained in subsequent sections, at the end (here, the end is the successful completion of the sub conversation took place in either 205 or 207) updating the state of process 201 linking the next sub conversation unit as indicated by arrows in FIG. 2. According to the subsequent detailed descriptions on Decision Making sub conversation units, at the end of a successful sub conversations, multiple outcomes can occur as depicted in FIG. 2, connecting unit 204 to multiple Information utterance blocks (202 and 203) and to unit 207.

FIG. 3 is an exemplary implementation of the Information Seek sub conversation unit, according to the present innovation. The Information Seek sub conversation unit may be implemented at least in part by the system 120, such as the platform services 136 and/or the NLG services 134. The purpose of the Information Seek unit is to drive a sub conversation where the system tries to gather information from the user. Process 300 may be initiated by forwarding a user utterance 301 into the Information Seek sub conversation unit. Process 300 may be carried out based on the Global Intents if there is no previous continuation of a conversation within the sub conversation unit or based on the fact that there is a conversation continuing in the same sub conversation unit. In the intent classification level defined by 302, it is decided whether or not the user utterance 301 implies a continuation of a current sub conversation. If the user utterance 301 is a discontinuation as depicted by 303, the system forwards user utterance 301 to be classified as a Global Intent by the process 304 or else forwards the user utterance 301 to be classified by Intent Level 2 as depicted in 307. Then it may be necessary, in the depicted instance, to classify the user utterance 301, to determine whether or not 301 is a fact related followup question.

In the case of detecting (308) a fact based followup question, process 325 may compose an answer 326. The facts and the relation to other facts are preconfigured in the process 325. As an effective strategy of preconfiguring a fact in process 325, a strategically written paragraph in a natural language such as English may be used. Accordingly, the configuration will be much easier in process 325, while the facts are structured naturally in a way that the process will be able to find answers to natural language based queries such as 301. Upon determining whether or not response 326 is empty or not as depicted by 327, the response will be forwarded to the user by process 329 following the condition 328 or the a response implying that the answer is not found, will be forwarded to the user by process 332.

Considering the outcome of 307, the system may choose to gather information in the case of meeting condition 306. Gathering information always corresponds to the last question asked by the system. When the conversation enters any Information Seeking sub conversation unit, it is assumed that the sub conversation unit will forward the first question to the user at the moment of initiation. Please note that the process in FIG. 3 assumes that the initiation has been done including, forwarding the first question of the Information Seeking sub conversation unit along with any other preferred initial utterance that is appropriate for starting a Information Seeking sub conversation.

The block 311 implies another intent classification level that will evaluate the aforesaid user utterance 301. Outcome 309 depicts an intention derived from the user utterance 301 as modifying or recorrection to a previous information given by the user. In such a condition, process 310 will ask a followup question in order to get the new information to any of the previous questions intended by the user. The outcome 312 implies an attempt to get clarification for the last question the user received from the system. The process 313 will take care of generating a clarified version of the last question sent to the user from the system considering predefined ruleset in the process 313. The outcome 318 results in an attempt to extract information from the user utterance 301 by the process 330. The process 330 will also represent any other related processes such as storing the extracted entity or even triggering a predefined action such as but not limited to forwarding data to an external system.

The extracted answer 319 can be empty or filled with the extracted entity. There can be situations where the system fails consecutively to extract the answers. The block 317 may then include checking the number of failures and comparing the number of failures with a predefined threshold which will result in outcome 316 or 320. The outcome 320 corresponds to a consecutive failure of extracting an entity related to the last question received to the user from the system. In such scenarios, the user utterance 301 will be forwarded to the Global Intent Classification by the process 323.

The outcome 316 from the block 317 implies that the consecutive failures of the process 330 is less than the number of a predefined threshold which leaves us with two outcomes from the block 315 that checks whether the last attempt of the process 330 failed or not. The aforesaid two outcomes include successful operation in the process 330 depicted as 331 or failure in the process 330 depicted as 314. In the case of outcome 314, the process 313 attempts to clarify the last question. In the case of the outcome 331, the system checks whether it has reached the end of all questions preconfigured in the Information Seek sub conversation unit. If the end of all questions is reached (depicted as 321), the system should move into another sub conversation unit which will be handled by the process 324 upon the outcome 321. If the end of all the question is not reached as an outcome 325 of the block 322, the process 326 will move to the next preconfigured question in the current Information Seeking sub conversation unit by sending the question to the user.

Figure 4:
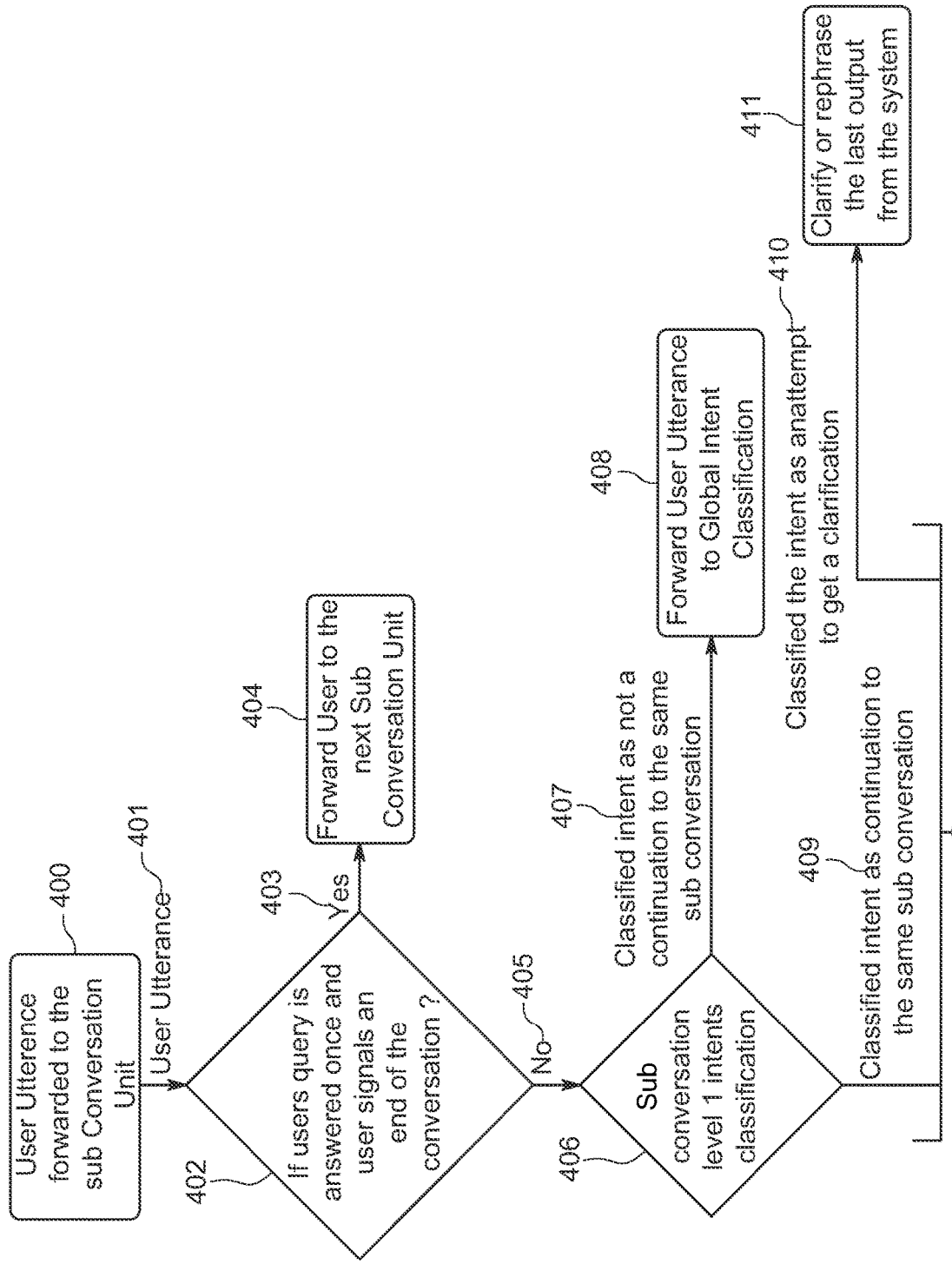
FIG. 4 is a flow chart explaining the dialog management strategy in an Information Utterance sub conversation unit, according to an embodiment of the present invention.
Figure 4:
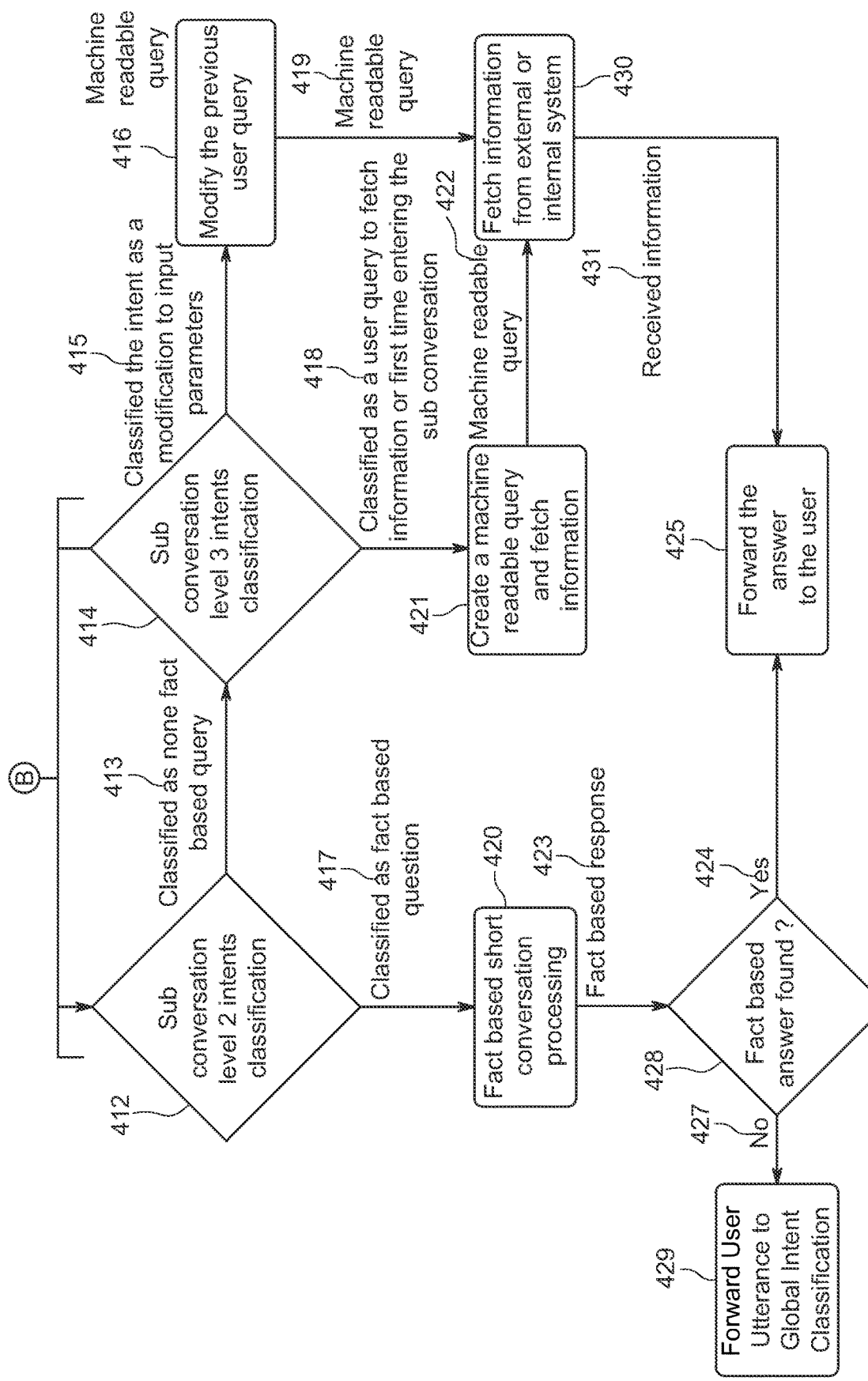

FIG. 4 is an exemplary implementation of the Information Utterance sub conversation unit, according to the present innovation. The Information Utterance sub conversation unit may be implemented at least in part by the system 120, such as the platform services 136 and/or the NLG services 134. Information Utterance unit's purpose is to have a sub conversation on a predefined knowledge domain. The user may query various information from the Information Utterance unit for a predefined domain. There may be two aspects of this sub conversation, where one being the discussion around the main source of information which might be coming from an external or an internal system and the other being the discussion on the facts related to the main information source. One practical example can be a sub conversation around a scenario where a user tries to check room availability at a hotel. In such a scenario, the main information source can be an external database which is used to derive the availability of rooms while some of the related facts can be about the cancelation policy of the booking or refund policy.

Process 400 can be any form of forwarding the user utterance 401 into the Information Utterance sub conversation unit. Process 400 may be carried out based on the Global Intents if there is no previous continuation of conversation within the sub conversation unit or based on the fact that there is a conversation continuing in the same sub conversation unit. In a sub conversation of the kind of Information Utterance, then most probably it is in user's control to end the sub conversation whenever the user intends. This can happen in multiple ways which are handled in blocks represented in FIG. 4. The block 402 will decide whether the user's previous queries are answered and whether the user signals an end to the current Information Utterance sub conversation. In the case of outcome 403, the process 404 moves to the next sub conversation unit.

The outcome 405 leads to an evaluation of the user utterance 401 by the intent classification 406 to evaluate whether or not the user utterance 401 signals a discontinuation of the current sub conversation. In the case of outcome 407, it implies that the user signals an interruption to the current sub conversation and hence the process 408 forwards the utterance 401 to be handled based on the Global Intent classification. In the case of the outcome 409, the utterance 401 will be evaluated by the block 412 to determine whether the utterance 401 intends to be a question on related facts. The internals of the process 412 is more or less similar to the process 325 as described previously and hence performs similar functionality. Explanations to 423, 424, 426, 427, 428 and 429 follow similar explanations to 326, 328, 329, 324, 327 and 323 consecutively.

The outcome 413 may take place upon the block 412 deciding that the utterance 401 is not a fact based query. As a result of 413, the user utterance 401 may be classified by the block 414 resulting outcomes 410, 415 and 418. The outcome 410 may imply that the utterance 401 is an attempt to get a clarification to the last utterance and the clarification or rephrasing will be done by the process 411. In the occurrence of 415, where the utterance is classified as a request to modify the previous query from the user, the process 416, handles taking the new inputs from the user and modifying the previous query created by the system to fetch information. The process 416 can be implemented in many forms including but not limited to going back a previous Information Seeking sub conversation and handling the information gathering process and then returning back to the last Information Seeking sub conversation with modified information to generate a machine readable query 419 to fetch information.

The outcome 418 results in creating a machine readable query 422 by the process 421. The outcome 418 can happen if the block 414 detects that the user intention is to provide a query that can be used to fetch information by the process 430. Another scenario implied by the outcome 418 is that in the case of existence of an Information Seeking sub conversation unit or a Decision Making sub conversation unit prior to the current Information Utterance sub conversation block, the outcome 418 can occur based on already acquired data from previous sub conversation units. The outcome 418 leads to the process 421 where a machine understandable query 422 is generated.

The process 430 takes machine understandable queries 419 and 422 to fetch information from an external or an internal system where the operation of fetching can be in any form of computer network based communication or any form of accessing a digital memory or any form of accessing a digital storage device. The received response from the aforesaid external or internal system can then be processed or modified to generate the response 431. The process 425 uses the response 431 to generate a human readable natural language based response and forwards to the user.

Figure 5:
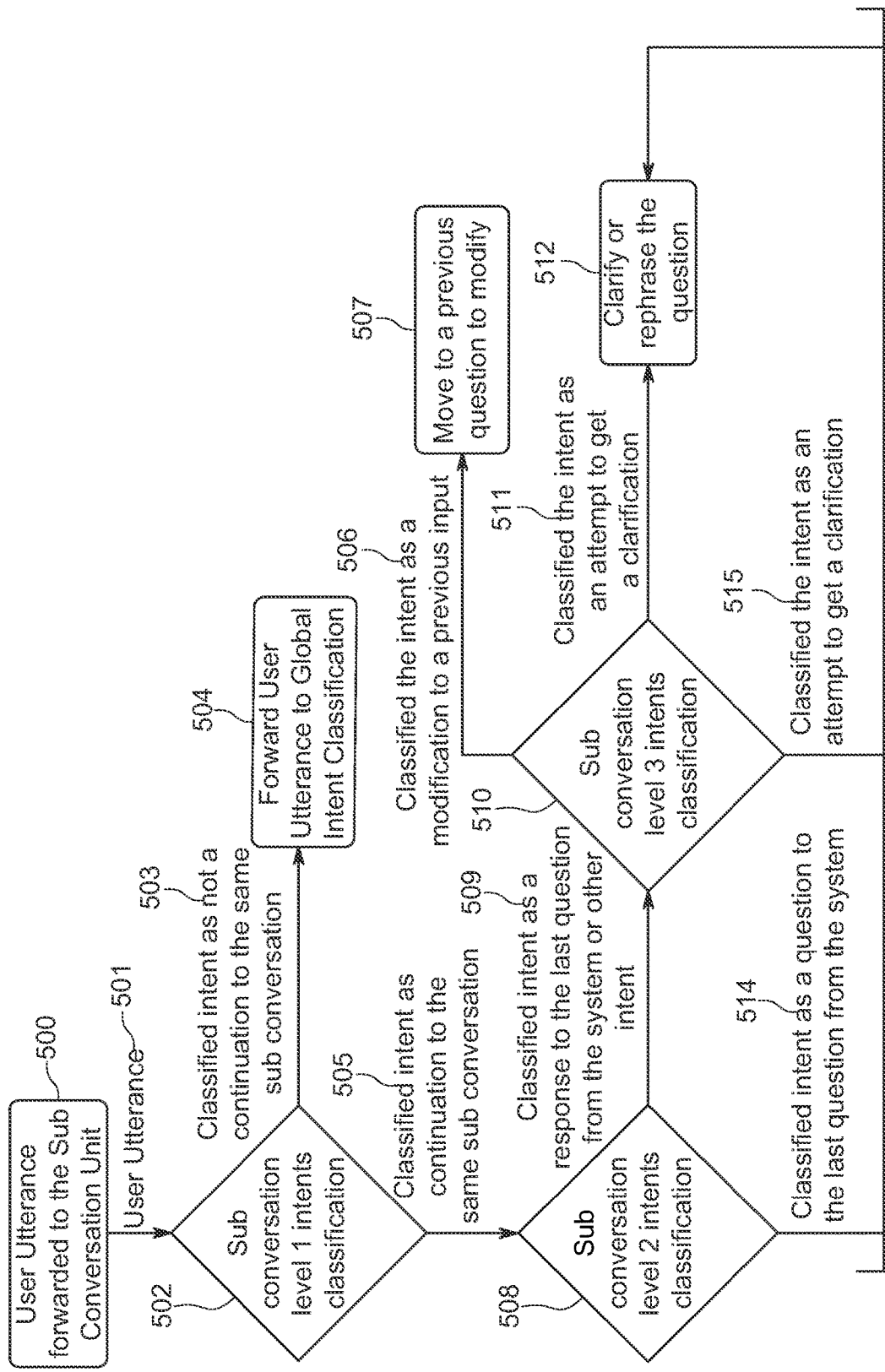
FIG. 5 is a flow chart explaining the dialog management strategy in a Decision Making sub conversation unit, according to an embodiment of the present invention.
Figure 5:
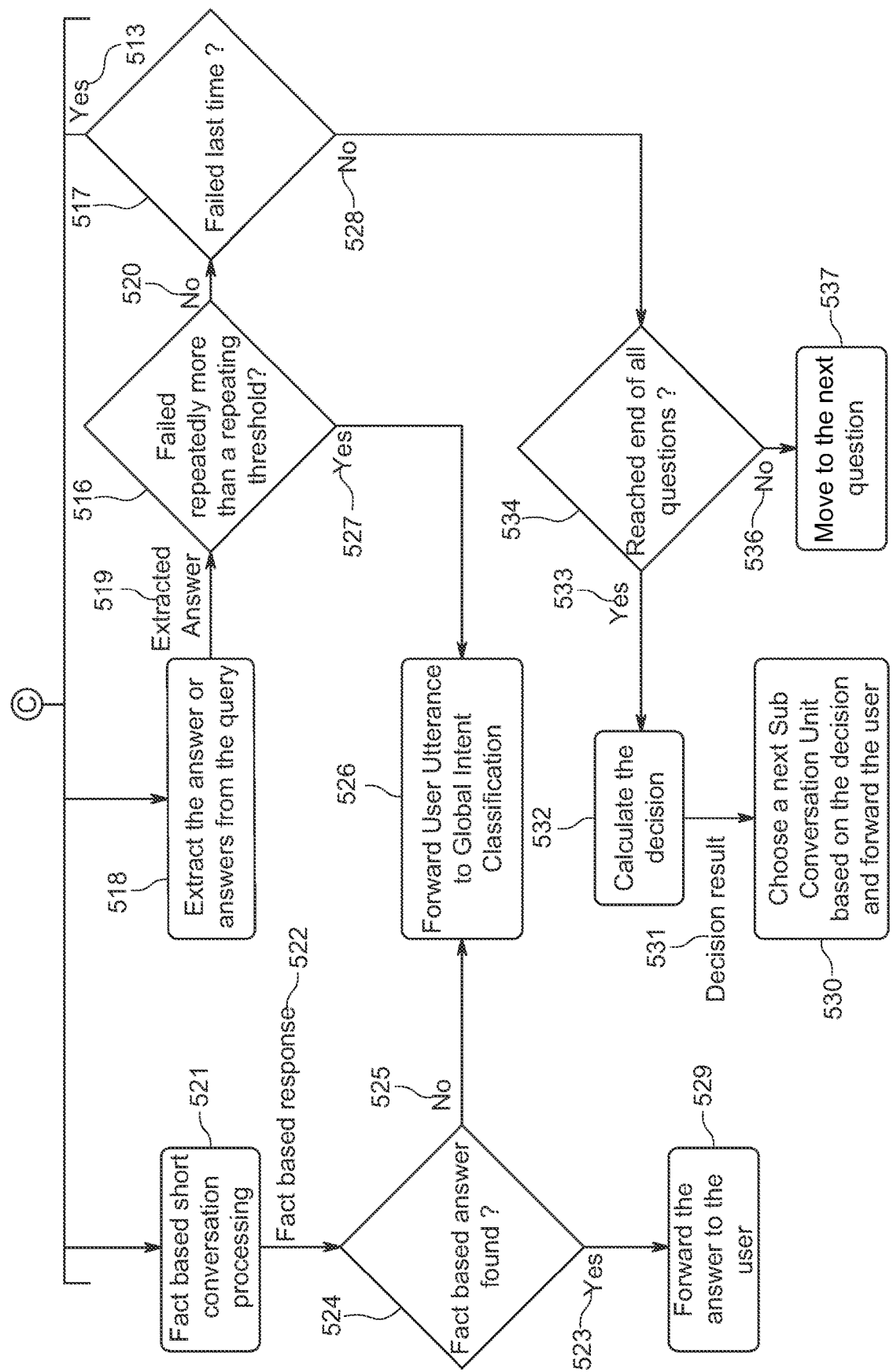

FIG. 5 depicts an exemplary implementation of the Decision Making sub conversation unit, according to the present invention. The Decision Making sub conversation unit may be implemented at least in part by the system 120, such as the platform services 136 and/or the NLG services 134. The purpose of the Decision Making sub conversation unit is to drive a sub conversation with the user to derive a decision based on information extracted from the sub conversation. To maintain the scope of the sub conversation, the system drives the sub conversation with preconfigured questions where it allows the user to have the freedom to raise questions. Aforesaid argument creates a lot of similarities between the Information Seeking and Decision Making sub conversation units. These are two of the main aspects that differentiate Information Seeking and Decision Making sub conversation units. The Decision Making sub conversation unit asks questions to gather measures of comparable information whereas the Information Seeking unit gathers information mainly for recording purposes. The other differentiator is that the selection of the next sub conversation that may occur after the current Decision Making sub conversation unit out of many possible sub conversation units has a dependency on the decision made within the Decision Making sub conversation unit.

Process 500 can be any form of forwarding the user utterance 501 into the Decision Making sub conversation unit. Process 500 will be carried out based on the Global Intents if there is no previous continuation of conversation within the sub conversation unit or based on the fact that there is a conversation continuing in the same sub conversation unit. The block 502, classifies the intention of the utterance 501 in order to decide whether the user intends or not to continue the sub conversation happening in the Decision Making sub conversation block. The outcome 503 implies that the user intends not to continue the current sub conversation and hence the process 504 will forward the user utterance 501 to the Global Intent classification to start another sub conversation.

The outcome 505 implies that the intention of the utterance 501 is classified as a continuation to the current sub conversation and hence the block 508 classifies whether the user utterance 501 intends to a question on a fact known to the system around the scope of the sub conversation. In the occurrence of outcome 514 the system attempts to answer considering the utterance 501 as a fact based query from the user. The purposes and the explanations of 521, 522, 523, 524, 525, 526 and 529 are equivalent to 325, 326, 328, 327, 324, 323 and 329 which are previously explained.

In the occurrence of the outcome 509, the user utterance 501 is evaluated by the block 510 which results in the outcomes 506, 511 and 515. The explanations for 506, 510, 511, 512, 513, 515, 516, 517, 518, 519, 520, 526, 528, 533 and 536 are equivalent to explanations of 309, 311, 312, 313, 314, 318, 317, 315, 330, 319, 316, 332, 331, 321 and 325.

The process 532, takes collected information (collected within the Decision Making sub conversation as responses to questions or in other means) into account and derives the decision result 531 considering the predefined decision options, based on statistical methods, predefined rules or other mathematical methods. According to the decision result 531 and in the case of reaching the last question of the current sub conversation as depicted by 533, the process 530 selects the next sub conversation unit (from a set of sub conversation units) and forwards the user to the selected sub conversation unit. In the case where the result 531 does not contain any decision state and when the final question is reached as depicted by 533, then the user utterance 500 is forwarded to the Global Intent Classification process to derive the next sub conversation unit. But, when the current question is not the final question of the current sub conversation as per the outcome 536, it is checked whether the decision result 531 is empty or not according to block 538. In the case of outcome 539, where the decision result 531 is non-empty, then the current sub conversation is stopped and a new sub conversation is started following the process 500. However, if the result 531 is empty according to outcome 540, the next question is presented to the user as depicted by 537.

Example

Following is a sample conversation about a hotel booking process taking place in information seeking sub conversation.

| Utterance | Party | Explanation |
|---|---|---|
| May I know your arrival date and departure date | AI | Information Seeking block presents the first question and waits for date inputs. |
| Sure. I will be arriving on 14th October and stay until 16th | User | User provide dates and system extracts the date from the utterances and stores |
| What is the room type you prefer? | AI | Information Seeking block moves to the next question. |
| Before I proceed further, I want to know about the cancellation policy | User | User interrupts and asks a question on cancellation policy. |
| No problem. You can cancel the booking before 5 days of arrival and we will be refunding up to 75%. | AI | User utterance is classified by level 2 intent classifier and generate an answer based on the strategically configured paragraph that defines the knowledge base of the Information Seeking block |
| Does that mean there is no refund if I cancel within the last 5 days? | User | User again interrupts and asks a followup question on cancellation policy. |
| Yes. There will be no refund | AI | User utterance is classified by level 2 intent classifier and generate an answer based on the strategically configured paragraph that defines the knowledge base of the Information Seeking block |
| Then, can I change the arrival date again | User | User intends to go back and change the previous response provided. |
| No problem. What is your arrival date? | AI | User utterance is processed by the level 3 intent classifier and understood that the user wants to change/re-correct previous statements related to arrival and departure times. |

Figure 6:
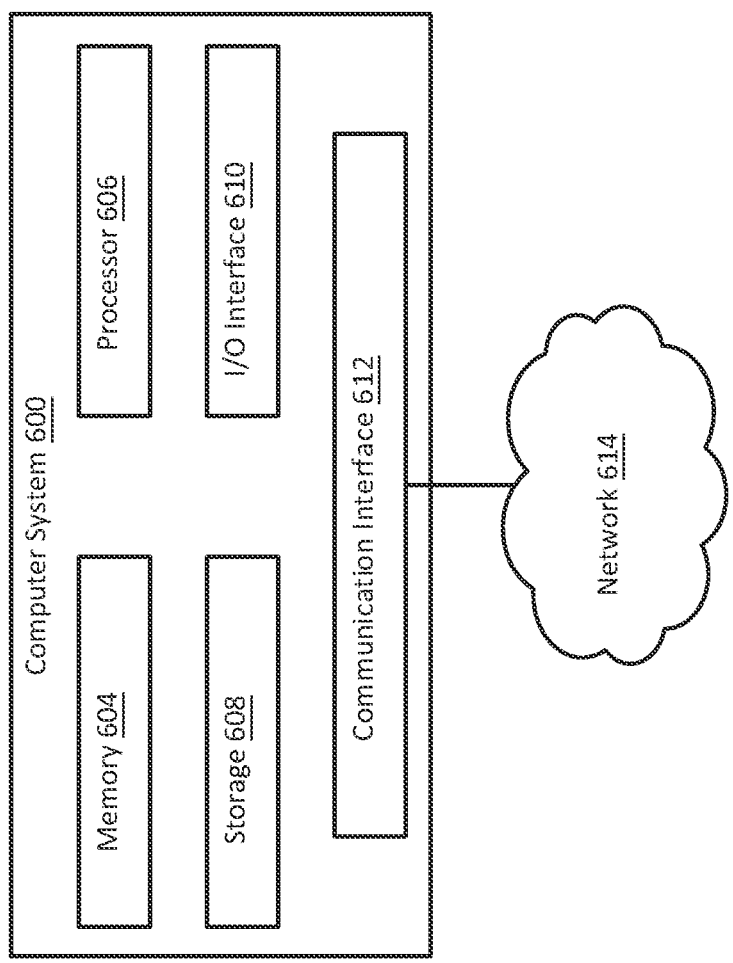
FIG. 6 depicts a computer system according to an exemplary embodiment of the present disclosure.

FIG. 6 illustrates an example computer system 600 that may be utilized to implement one or more of the devices and/or components discussed herein, such as the systems 100, 120. In particular embodiments, one or more computer systems 600 perform one or more steps of one or more methods, processes, or services described or illustrated herein. In particular embodiments, one or more computer systems 600 provide the functionalities described or illustrated herein. In particular embodiments, software running on one or more computer systems 600 performs one or more steps of one or more methods described or illustrated herein or provides the functionalities described or illustrated herein. Particular embodiments include one or more portions of one or more computer systems 600. Herein, a reference to a computer system may encompass a computing device, and vice versa, where appropriate. Moreover, a reference to a computer system may encompass one or more computer systems, where appropriate.

This disclosure contemplates any suitable number of computer systems 600. This disclosure contemplates the computer system 600 taking any suitable physical form. As example and not by way of limitation, the computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, the computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 606, memory 604, storage 608, an input/output (I/O) interface 610, and a communication interface 612. Although this disclosure describes and illustrates a particular computer system having a particular number of particular components in a particular arrangement, this disclosure contemplates any suitable computer system having any suitable number of any suitable components in any suitable arrangement.

In particular embodiments, the processor 606 includes hardware for executing instructions, such as those making up a computer program. As an example and not by way of limitation, to execute instructions, the processor 606 may retrieve (or fetch) the instructions from an internal register, an internal cache, memory 604, or storage 608; decode and execute the instructions; and then write one or more results to an internal register, internal cache, memory 604, or storage 608. In particular embodiments, the processor 606 may include one or more internal caches for data, instructions, or addresses. This disclosure contemplates the processor 606 including any suitable number of any suitable internal caches, where appropriate. As an example and not by way of limitation, the processor 606 may include one or more instruction caches, one or more data caches, and one or more translation lookaside buffers (TLBs). Instructions in the instruction caches may be copies of instructions in memory 604 or storage 608, and the instruction caches may speed up retrieval of those instructions by the processor 606. Data in the data caches may be copies of data in memory 604 or storage 608 that are to be operated on by computer instructions; the results of previous instructions executed by the processor 606 that are accessible to subsequent instructions or for writing to memory 604 or storage 608; or any other suitable data. The data caches may speed up read or write operations by the processor 606. The TLBs may speed up virtual-address translation for the processor 606. In particular embodiments, processor 606 may include one or more internal registers for data, instructions, or addresses. This disclosure contemplates the processor 606 including any suitable number of any suitable internal registers, where appropriate. Where appropriate, the processor 606 may include one or more arithmetic logic units (ALUs), be a multi-core processor, or include one or more processors 606. Although this disclosure describes and illustrates a particular processor, this disclosure contemplates any suitable processor.

In particular embodiments, the memory 604 includes main memory for storing instructions for the processor 606 to execute or data for processor 606 to operate on. As an example, and not by way of limitation, computer system 600 may load instructions from storage 608 or another source (such as another computer system 600) to the memory 604. The processor 606 may then load the instructions from the memory 604 to an internal register or internal cache. To execute the instructions, the processor 606 may retrieve the instructions from the internal register or internal cache and decode them. During or after execution of the instructions, the processor 606 may write one or more results (which may be intermediate or final results) to the internal register or internal cache. The processor 606 may then write one or more of those results to the memory 604. In particular embodiments, the processor 606 executes only instructions in one or more internal registers or internal caches or in memory 604 (as opposed to storage 608 or elsewhere) and operates only on data in one or more internal registers or internal caches or in memory 604 (as opposed to storage 608 or elsewhere). One or more memory buses (which may each include an address bus and a data bus) may couple the processor 606 to the memory 604. The bus may include one or more memory buses, as described in further detail below. In particular embodiments, one or more memory management units (MM Us) reside between the processor 606 and memory 604 and facilitate accesses to the memory 604 requested by the processor 606. In particular embodiments, the memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory implementations, this disclosure contemplates any suitable memory implementation. In particular embodiments, the storage 608 includes mass storage for data or instructions. As an example and not by way of limitation, the storage 608 may include a hard disk drive (HDD), a floppy disk drive, flash memory, an optical disc, a magneto-optical disc, magnetic tape, or a Universal Serial Bus (USB) drive or a combination of two or more of these. The storage 608 may include removable or non-removable (or fixed) media, where appropriate.

The storage 608 may be internal or external to computer system 600, where appropriate. In particular embodiments, the storage 608 is non-volatile, solid-state memory. In particular embodiments, the storage 608 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 608 taking any suitable physical form. The storage 608 may include one or more storage control units facilitating communication between processor 606 and storage 608, where appropriate. Where appropriate, the storage 608 may include one or more storages 608. Although this disclosure describes and illustrates particular storage, this disclosure contemplates any suitable storage.

In particular embodiments, the I/O Interface 610 includes hardware, software, or both, providing one or more interfaces for communication between computer system 600 and one or more I/O devices. The computer system 600 may include one or more of these I/O devices, where appropriate. One or more of these I/O devices may enable communication between a person (i.e., a user) and computer system 600. As an example and not by way of limitation, an I/O device may include a keyboard, keypad, microphone, monitor, screen, display panel, mouse, printer, scanner, speaker, still camera, stylus, tablet, touch screen, trackball, video camera, another suitable I/O device or a combination of two or more of these. An I/O device may include one or more sensors. Where appropriate, the I/O Interface 610 may include one or more device or software drivers enabling processor 606 to drive one or more of these I/O devices. The I/O interface 610 may include one or more I/O interfaces 610, where appropriate. Although this disclosure describes and illustrates a particular I/O interface, this disclosure contemplates any suitable I/O interface or combination of I/O interfaces.

In particular embodiments, communication interface 612 includes hardware, software, or both providing one or more interfaces for communication (such as, for example, packet-based communication) between computer system 600 and one or more other computer systems 600 or one or more networks 614. As an example and not by way of limitation, communication interface 612 may include a network interface controller (NIC) or network adapter for communicating with an Ethernet or any other wire-based network or a wireless NIC (WNIC) or wireless adapter for communicating with a wireless network, such as a Wi-Fi network. This disclosure contemplates any suitable network 614 and any suitable communication interface 612 for the network 614. As an example and not by way of limitation, the network 614 may include one or more of an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth® WPAN), a WI-FI network, a WI-MAX network, a cellular telephone network (such as, for example, a Global System for Mobile Communications (GSM) network), or any other suitable wireless network or a combination of two or more of these. Computer system 600 may include any suitable communication interface 612 for any of these networks, where appropriate. Communication interface 612 may include one or more communication interfaces 612, where appropriate. Although this disclosure describes and illustrates a particular communication interface implementations, this disclosure contemplates any suitable communication interface implementation.

The computer system 602 may also include a bus. The bus may include hardware, software, or both and may communicatively couple the components of the computer system 600 to each other. As an example and not by way of limitation, the bus may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-PIN-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these buses. The bus may include one or more buses, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (e.g., field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Throughout this specification and the claims that follow, unless the context requires otherwise, the words 'comprise' and 'include' and variations such as 'comprising' and 'including' will be understood to imply the inclusion of a stated integer or group of integers but not the exclusion of any other integer or group of integers.

The invention claimed is:

1. A computer implemented method for processing natural language utterances and generating natural language responses, the method comprising:
   receiving user utterances in a natural language;
   classifying the user utterances into one or more intents;
   defining a knowledge domain and a scope for a conversational task for the one or more intents;
   configuring the conversational task as a combination of sub conversation units, wherein each sub conversation unit is bounded by a specific objective;
   transferring between sub conversation units based on an outcome of a previous sub conversation unit;
   extracting information from the user utterances based on a localized strategy for a current sub conversation unit; and
   generating responses to the user utterances in the natural language, based on the current sub conversation unit.

2. The method of claim 1, wherein generating the responses to the user utterances further comprises:
   connecting to a database to retrieve further information required to generate the responses to the user utterances, or to update the information that was extracted from the user utterances.

3. The method of claim 1, wherein classifying the user utterances includes providing a global level intent classification, which is used as a default in the case that there is no reference to a sub conversation which is going to be continued for a given user session.

4. The method of claim 1, wherein classifying the user utterances includes multiple intent classification stages individually implemented in each sub conversation unit, where in one sub conversation unit the multiple intent classification stages represents at least one classification chosen from the list consisting of:
   a classification on a user's intent to continue the current sub conversation unit,
   a classification to decide whether a user utterance should be answered based on related facts to a main objective of the current sub conversation unit,
   a classification to decide whether the user wants to update previously provided information, and
   a classification to decide whether a last utterance forwarded to the user has been understood by the user while being in the current sub conversation unit.

5. The method of claim 4, wherein the classification to decide whether the user utterance should be answered based on related facts to the main objective of the current sub conversation unit, is linked to a structure of facts related to each other in different forms, where relationships and an order of relationships are organized as a natural language based paragraph, strategically formed, from which answers are derived upon a classification outcome of the classification to decide whether the user utterance should be answered based on related facts.

6. The method of claim 1, wherein configuring the conversational task as a combination of sub conversation units comprises configuring at least one sub conversation unit chosen from the list consisting of:
   an information seeking sub conversation unit which is focused on gathering information from a user on a particular knowledge subdomain, wherein the information seeking sub conversation unit drives a sub conversation using a predefined question set,
   a decision making sub conversation unit which is focused on decision making guided by a predefined set of questions, where one of a plurality of decision states is derived based on answer combinations extracted from the user utterances, and
   an information utterance sub conversation unit which is focused on uttering information based on a knowledge source, on a defined topic, in accordance with requests derived from the user utterances.

7. A system for processing natural language utterances and generating natural language responses comprising:
   one or more hardware processing units with one or more non-transitory computer readable memory units configured to:
      receive user utterances in a natural language;
      classify the user utterances into one or more intents;

define a knowledge domain and a scope for a conversational task for the one or more intents;

configure the conversational task as a combination of sub conversation units, wherein each sub conversation unit is bounded by a specific objective, wherein the one or more hardware processing units are configured to transfer between sub conversation units depending on an outcome of a previous sub conversation unit; and extract information from the user utterances based on a localized strategy for a current sub conversation unit; and generate responses to the user utterances in the natural language, based on the current sub conversation unit.

8. The system of claim 7, wherein the one or more hardware processing units are further configured to generate the responses to the user utterances by:

connecting to a database to retrieve further information required to generate the responses to the user utterances, or to update the information extracted from the user utterances.

9. The system of claim 7, wherein classifying the user utterances includes providing a global level intent classification, which is used as a default in the case that the system has no reference to a sub conversation which is going to be continued for a given user session.

10. The system of claim 7, wherein classifying the user utterances includes multiple intent classification stages individually implemented in each sub conversation unit, where in one sub conversation unit the multiple intent classification stages represents at least one classification chosen from the list consisting of:

a classification on a user's intent to continue the current sub conversation unit, a classification to decide whether a user utterance should be answered based on related facts to a main objective of the current sub conversation unit, a classification to decide whether the user wants to update previously provided information, and a classification to decide whether a last utterance forwarded to the user has been understood by the user while being in the current sub conversation unit.

11. The system of claim 10, wherein the classification to decide whether the user utterance should be answered based on related facts to the main objective of the current sub conversation unit, is linked to a structure of facts related to each other in different forms, where relationships and an order of relationships are organized as a natural language based paragraph, strategically formed, from which answers are derived upon a classification outcome of the classification to decide whether the user utterance should be answered based on related facts.

12. The system of claim 7, wherein configuring the conversational task as a combination of sub conversation units comprises configuring at least one sub conversation unit chosen from the list consisting of:

an information seeking sub conversation unit which is focused on gathering information from a user on a particular knowledge subdomain, wherein the information seeking sub conversation unit drives a sub conversation using a predefined question set;

a decision making sub conversation unit which is focused on decision making guided by a predefined set of questions, where one of a plurality of decision states is derived based on answer combinations extracted from the user utterances; and an information utterance sub conversation unit which is focused on uttering information based on a knowledge source, on a defined topic, in accordance with requests derived from the user utterances.

* * * * *